US006930281B2

(12) United States Patent
Delgado

(10) Patent No.: US 6,930,281 B2
(45) Date of Patent: Aug. 16, 2005

(54) SYSTEM FOR COOLING A WELDING DEVICE

(75) Inventor: David Delgado, Rancho Cucamonga, CA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/677,781

(22) Filed: Oct. 2, 2003

(65) Prior Publication Data

US 2005/0072762 A1    Apr. 7, 2005

(51) Int. Cl.[7] .............................................. B23K 9/167
(52) U.S. Cl. .................................. 219/137.62; 219/75
(58) Field of Search ............................ 219/137.62, 75, 219/136

(56) References Cited

U.S. PATENT DOCUMENTS

| | | | |
|---|---|---|---|
| 3,250,889 A | * 5/1966 | Himmelman | 219/75 |
| 3,283,121 A | 11/1966 | Bernard et al. | 219/130 |
| 3,634,643 A | 1/1972 | Himmelman | 219/75 |
| 3,676,640 A | 7/1972 | Bernard et al. | 219/130 |
| 3,728,514 A | 4/1973 | Bernard et al. | 219/130 |
| 3,746,832 A | 7/1973 | Bernard et al. | 219/130 |
| 3,803,381 A | 4/1974 | Bernard et al. | 219/130 |
| 3,976,852 A | 8/1976 | Van Horn | 219/75 |
| 4,105,891 A | 8/1978 | Hill et al. | 219/137.43 |
| 4,313,046 A | 1/1982 | Henry et al. | 219/137.62 |
| 4,361,747 A | 11/1982 | Torrani | 219/75 |
| 4,508,951 A | 4/1985 | Rehrig, Jr. | 219/74 |
| 4,554,432 A | 11/1985 | Raloff | 219/137.43 |
| 5,045,665 A | 9/1991 | Sarkissian | 219/75 |
| 5,220,144 A | 6/1993 | Jusionis | 219/60 A |
| 5,288,963 A | 2/1994 | Jusionis | 219/60 A |
| 5,349,158 A | 9/1994 | Mari | 219/137.62 |
| 5,384,447 A | 1/1995 | Raloff et al. | 219/137.31 |
| 5,403,987 A | 4/1995 | Rehrig | 219/75 |
| 5,473,132 A | * 12/1995 | Sperling | 219/75 |
| 5,571,427 A | 11/1996 | Dimock et al. | 219/75 |
| 5,611,951 A | 3/1997 | Kunz et al. | 219/137.62 |
| 6,005,221 A | * 12/1999 | Cusick, III | 219/137.62 |
| 6,078,023 A | 6/2000 | Jones et al. | 219/137.63 |
| 6,399,913 B1 | 6/2002 | Sammons et al. | 219/75 |

* cited by examiner

Primary Examiner—Clifford C. Shaw
(74) Attorney, Agent, or Firm—Fletcher Yoder

(57) ABSTRACT

A liquid-cooled welding device comprising a torch head body having a helical cooling fin extending along a length of the torch head body. A sleeve may be disposed around the torch head body to define a flow channel over the torch head body. The sleeve may have a liquid inlet and a liquid outlet to enable liquid to flow into and out of the flow channel. The liquid outlet may be located adjacent to the liquid inlet. The liquid-cooled welding device may have a baffle disposed within the sleeve between the liquid inlet and the liquid outlet to direct liquid to flow along the length of the torch head body to enable the helical cooling fin transfer heat to the liquid.

26 Claims, 5 Drawing Sheets

SYSTEM FOR COOLING A WELDING DEVICE

BACKGROUND OF THE INVENTION

The present invention relates generally to the field of arc welding, and more particularly to the field of liquid-cooled arc welding torches.

This section is intended to introduce the reader to various aspects of art which may be related to various embodiments of the present invention which are described and/or claimed below. This discussion is believed to be helpful in providing the reader with background information to facilitate a better understanding of various embodiments of the present invention. Accordingly, it should be understood that these statements are to be read in this light, and not as admissions of prior art.

Arc welding is a welding process in which an electric current is used to produce localized melting in a work piece. There are many different types of arc welding processes. One example of an arc welding process is TIG (Tungsten Inert Gas) welding (also known as gas tungsten arc welding, GTAW, or HELLARC). TIG welding is a type of arc welding process in which an electric arc is maintained between a welding implement, such as a hand-held welding torch, and a metal work piece. Typically, the welding implement includes a cylindrical electrode coupled to a torch head. The arc is produced by electricity that flows between the electrode and the work piece. Typically, the electrode is comprised of tungsten. The electricity for the arc welding process is provided by a power source coupled to the torch head of the welding implement by a power cable.

The electricity flowing through the torch head may produce a substantial amount of heat. In addition, the electricity flowing through the electrode and the work piece may produce heat that is transferred to the torch head. The heat introduced into the torch head may damage the components of the torch. In addition, the heat may make the torch difficult to hold. The amount of heat produced is a function of the current flowing through the torch. The torches may be air-cooled at low current levels. However, the ability of air-cooling to sufficiently cool the torch decreases as the amount of current flowing through the torch increases. Consequently, liquid-cooled welding torches have been developed to remove a greater amount of the heat from within the torch head, thereby enabling the torch to be operated at higher current levels. Typically, a liquid-cooling unit is coupled to the welding torch to supply a flow of liquid to cool the welding torch. The cooling unit also removes the heat transferred to the liquid from the welding torch. However, liquid-cooling units add a significant expense to the system. Typically, a lower capacity liquid-cooling unit is less expensive that a larger capacity liquid-cooling unit.

Therefore, a need exists for a technique to increase the amount of heat removed from a welding torch by liquid cooling. More specifically, a need exists for a technique to enable the liquid flowing through a welding torch to remove a greater amount of heat from the torch head.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
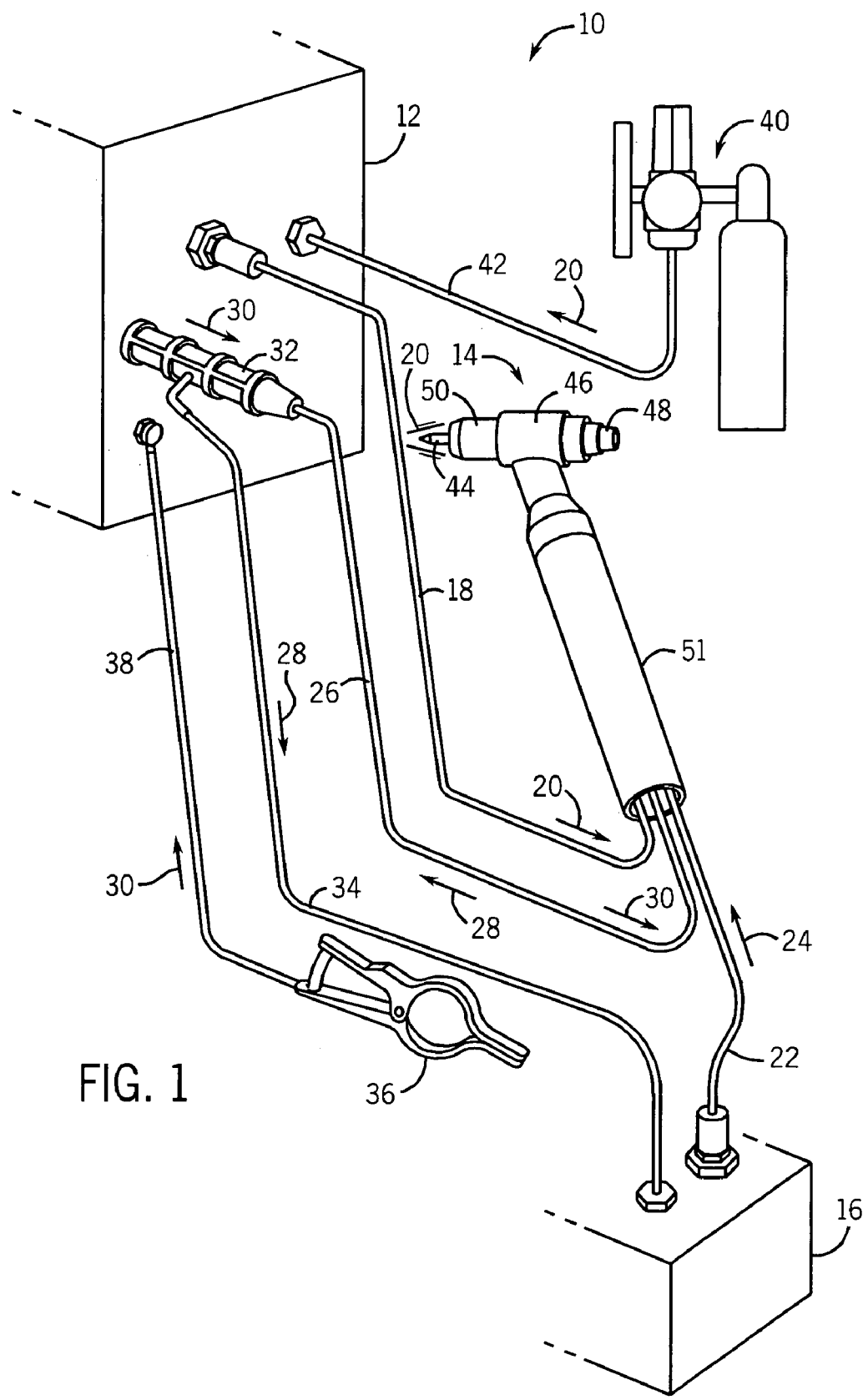
FIG. 1 is a perspective view of a liquid-cooled TIG welding system, in accordance with an exemplary embodiment of the present invention.

Referring generally to FIG. 1, a welding system 10 is illustrated. In the illustrated embodiment, the welding system 10 comprises a welding machine 12, a liquid-cooled TIG welding torch assembly 14, and a liquid cooling unit 16. However, the techniques described herein are applicable to arc welding systems other than TIG welding systems. The welding machine 12 is operable to provide the power to enable a user to weld with the welding torch assembly 14. The liquid cooling unit 16 is operable to provide a flow of liquid to remove heat from the welding torch assembly 14 produced during welding operations.

A flexible gas hose 18 is coupled between the welding machine 12 and the torch assembly 14 to enable the welding machine 12 to supply a shield gas 20 to the welding torch assembly 14. A liquid hose 22 is coupled between the liquid cooling unit 16 and the welding torch assembly 14 to enable the liquid cooling unit 16 to provide a supply of cooling liquid 24 to the torch assembly 14. In addition, a power cable 26 is coupled between the torch assembly 14 and the welding machine 12. The power cable 26 provides a flow path for heated cooling liquid 28 to flow from the torch assembly 14, as well as to provide a path for electric current 30 to flow to the torch assembly 14 from the welding machine 12. The power cable 26 has a connector 32 that is connected to the welding machine 12 to electrically couple the torch assembly 14 to the welding machine 12. A liquid hose 34 is coupled to the connector 32 to provide a return path for the heated cooling liquid 28 to flow back to the liquid cooling unit 16. The illustrated system 10 comprises a clamp 36 and a return cable 38 for electrically connecting a work piece to the welding machine 12.

In the illustrated embodiment, a regulated gas cylinder 40 and hose 42 are provided to supply gas 20 to the welding machine 12. However, another source of gas 20 may be used. In addition, the regulated gas cylinder 40 or some other source of gas, may be connected directly to the torch assembly 14.

The liquid-cooled welding torch assembly 14 is adapted to conduct electric current 30 to an electrode 44 secured to the torch assembly 14 and to direct the flow of gas 20 from the torch assembly 14. The liquid-cooled welding torch assembly 14 has a torch head 46 for receiving the electrode 44 and gas 20. The electrode 44 is disposed through one end of the torch head 46. A back cap 48 is provided to seal the opposite end of the torch head 46. The welding torch assembly 14 also comprises a nozzle 50 that is coupled to the torch head 46 to direct the gas 20 to flow from the welding torch assembly 14 in a desired pattern. A handle 51 is provided on the welding torch assembly 14 to enable a user to direct movement of the electrode 44.

Figure 2:
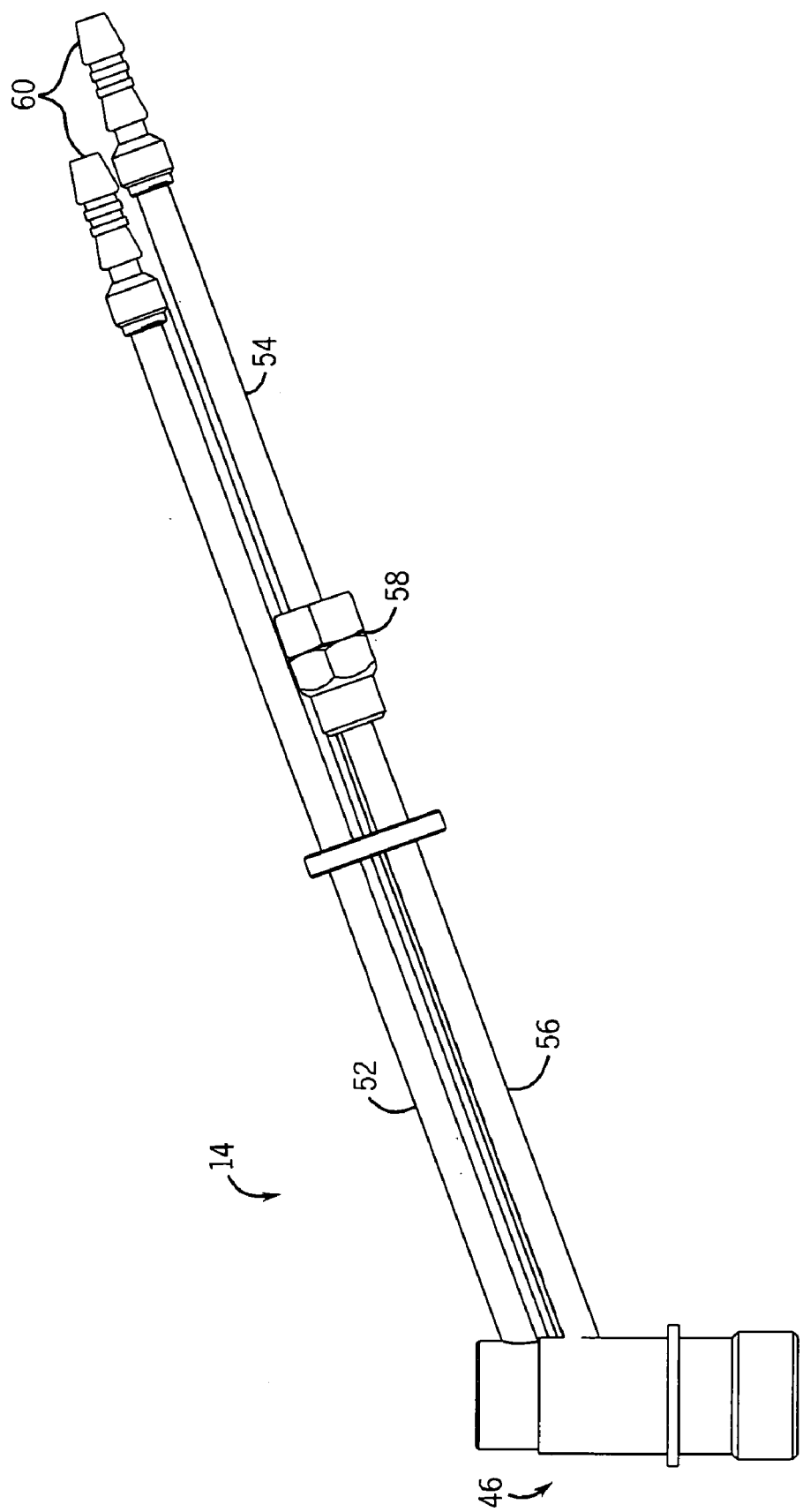
FIG. 2 is an elevation view of a portion of a liquid-cooled welding torch, in accordance with an exemplary embodiment of the present invention.

Referring generally to FIG. 2, a portion of the liquid-cooled welding torch assembly 14 is illustrated. In the illustrated embodiment, the liquid-cooled welding torch assembly 14 comprises a gas tube 52, a liquid supply tube 54, and a liquid return tube 56. An insulated cover may be molded over the welding torch assembly 14 to electrically insulate the torch head 46, the gas tube 52, the liquid supply tube 54, and the liquid return tube 56. In the illustrated embodiment, the return tube 56 couples electricity 30 to the torch head 46. The liquid return tube 56 has a fitting 58 that is adapted to receive electricity and liquid from the power cable 26. The gas tube 52 and the liquid supply tube 54 are adapted with fluid connectors 60 for connection to the gas hose 18 and the liquid hose 22, respectively.

Figure 3:
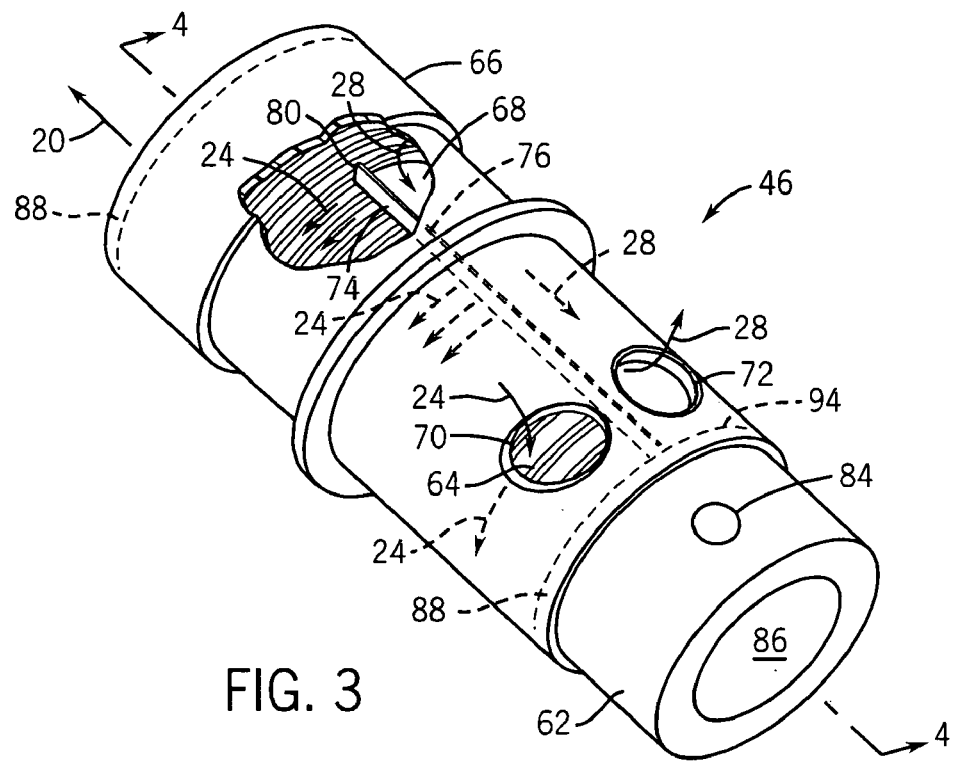
FIG. 3 is a partially-cut away view of a liquid-cooled welding torch head, in accordance with an exemplary embodiment of the present invention.
Figure 4:
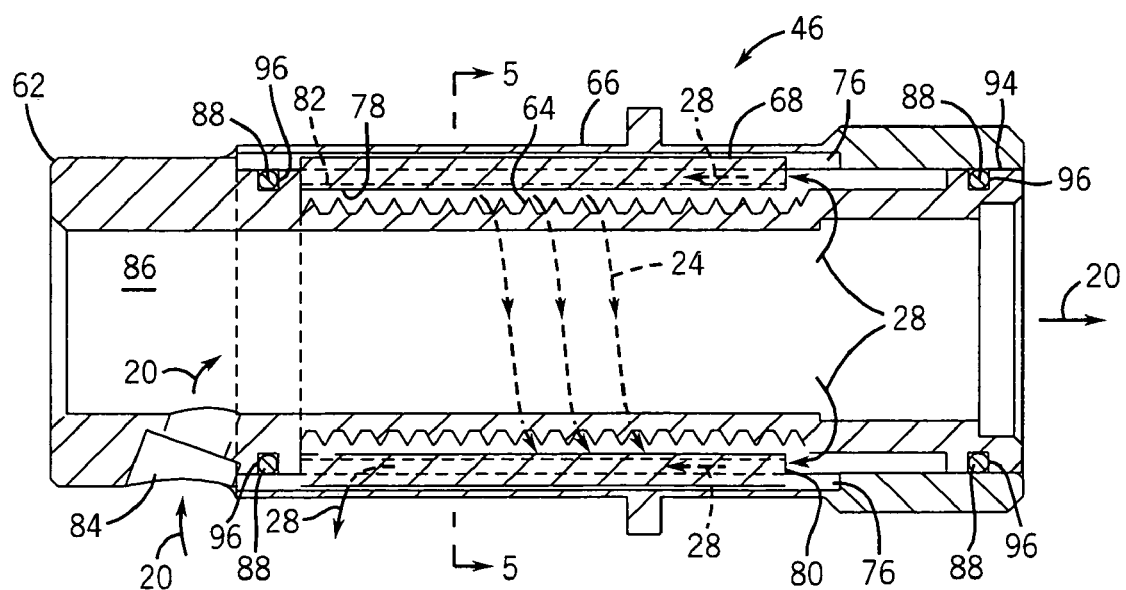
FIG. 4 is a cross-sectional view taken generally along line 4—4 of the liquid-cooled welding torch head of FIG. 3.
Figure 5:
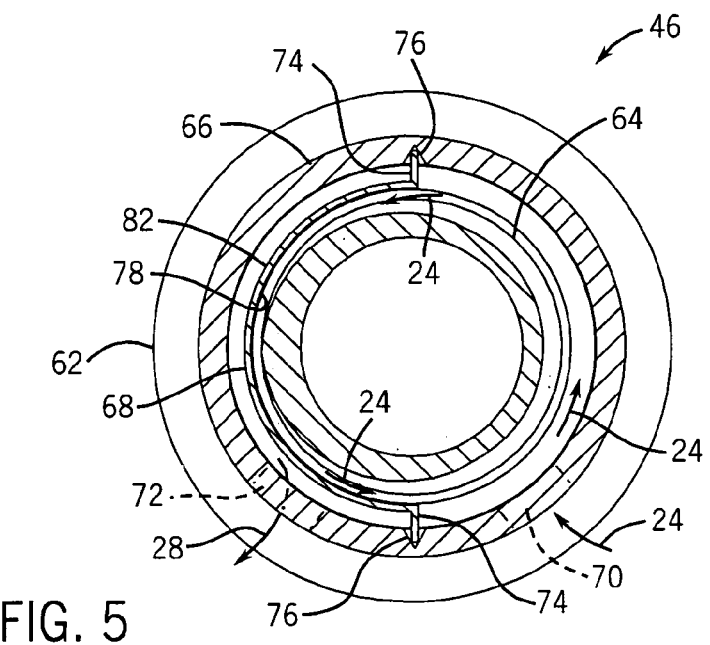
FIG. 5 is a cross-sectional view taken generally along line 5—5 of the torch head of the welding torch of FIG. 4.

Referring generally to FIGS. 3–5, the torch head 46 comprises a torch head body 62 having a helical cooling fin 64 that extends around the torch head body 62, a sleeve 66 disposed over the torch head body 62 to define a volume for cooling liquid 24 to flow through the torch head 46, and a baffle 68 to direct the flow of cooling liquid 24. The liquid supply tube 54 (illustrated in FIG. 2) is coupled to a liquid inlet 70 in the sleeve 66. The liquid inlet 70 enables cooling liquid 24 to flow from the liquid supply tube 54 into the welding torch 46. Conversely, the liquid return tube 56 (illustrated in FIG. 2) is coupled to a liquid outlet 72 in the sleeve 66. The liquid outlet 72 enables heated cooling liquid 28 to flow out of the torch head 46 to the liquid return tube 56. In the illustrated embodiment, the liquid inlet 70 and liquid outlet 72 are disposed proximate to one another at one end of the sleeve 66.

The baffle 68 deflects the heated cooling liquid 28 entering through the liquid inlet 70 so that the cooling liquid 24 is forced to flow along the length of the torch head body 62 over the helical cooling fin 64. Because the liquid inlet 70 and the liquid outlet 72 are located adjacent to each other, the cooling liquid 24 would simply flow straight from the liquid inlet 70 to the liquid outlet 72 if the baffle 68 were not disposed between the inlet 70 and outlet 72 to prevent it. In the illustrated embodiment, the baffle 68 has a flange 74 located along each of the two sides of the baffle 68. The flanges 74 are adapted to fit into two corresponding grooves 76 in the sleeve 66 to secure the baffle 68 to the sleeve 66. However, other methods of securing the baffle 68 to the sleeve 66 may be utilized.

In the illustrated embodiment, cooling liquid 24 flows into the torch head 46 through the liquid inlet 70 and heated cooling liquid 28 flows out of the torch head 46 through the liquid outlet 72. Generally, the cooling liquid 24 flows in the same direction as the gas 20. The helical cooling fin 64 urges the cooling liquid 24 to flow in a helical pattern around the torch head body 62. In the illustrated embodiment, the cooling liquid 24 is illustrated as flowing helically around the torch head body 62 between the torch head body 62 and the inner surface 78 of the baffle 68, removing heat from the torch head body 62 by forced convection. However, some or all of the cooling fluid 24 may flow linearly over the cooling fin 64. In addition, the cooling fluid 24 may induce turbulent flow of the cooling fluid 24. When the cooling liquid 24 reaches the end 80 of the baffle 68, the cooling liquid 24 reverses direction and flows in the opposite direction back towards the liquid outlet 72 in a flow channel formed between the outer surface 82 of the baffle 68 and the sleeve 66.

However, the direction that the cooling liquid 24 flows through the torch head 46 could be reversed. For example, the liquid supply tube 54 and the liquid return tube 56 could be reversed. In this arrangement, the cooling liquid 24 enters the torch head 46 via the liquid outlet 72. The cooling liquid flows in the flow channel formed between the outer surface 82 of the baffle 68 and the sleeve 66 from the liquid outlet 72 to the end 80 of the baffle 68. The cooling liquid 24 then changes direction and flows helically around the torch head body 62 from the end 80 of the baffle 68 to the liquid inlet 70.

The helical cooling fin 64 of the torch head body 62 enhances the effectiveness of heat transfer from the torch head body 62 to the cooling liquid 24. For one, the helical cooling fin 64 increases the surface area for convective heat transfer between the torch head body 62 and the cooling liquid 24. In addition, by inducing the cooling liquid to flow helically around the torch head body 62, the helical cooling fin 64 increases the effective length of the torch head body 62 as a heat exchanger. This enables a greater amount of heat to be transferred to the cooling liquid 24 from the torch head body 62. In addition, gas 20 flows through the interior of the torch head body 62. The torch head body 62 also has a gas inlet 84 to enable gas 20 to pass through the side of the torch head body to a central channel 86 that extends through the torch head body 62.

Referring generally to FIGS. 1 and 3, the central channel 86 also receives the welding electrode 44 through one end of the central channel 86. When installed, the back cap 48 seals the opposite end of the central channel 86 to prevent gas 20 from flowing from the rear of the torch head 46, rather than toward a work piece. From the gas inlet 84, gas 20 flows through the central channel 86 to the nozzle 50 and on toward a work piece.

Electricity flows through the liquid supply tube 54 to the sleeve 66. In the illustrated embodiment, electricity is conducted from the sleeve 66 to the torch head body 62 by a pair of silver rings 88. However, other devices may be used to conduct electrical current from the sleeve 66 to the torch head body. From the torch head body 62, electricity is conducted to the electrode 44. Various devices, such as a collet and collet body, may be used to secure the electrode 44 to the torch head body 62. These devices also serve to electrically couple the electrode 44 to the torch head body.

Figure 6:
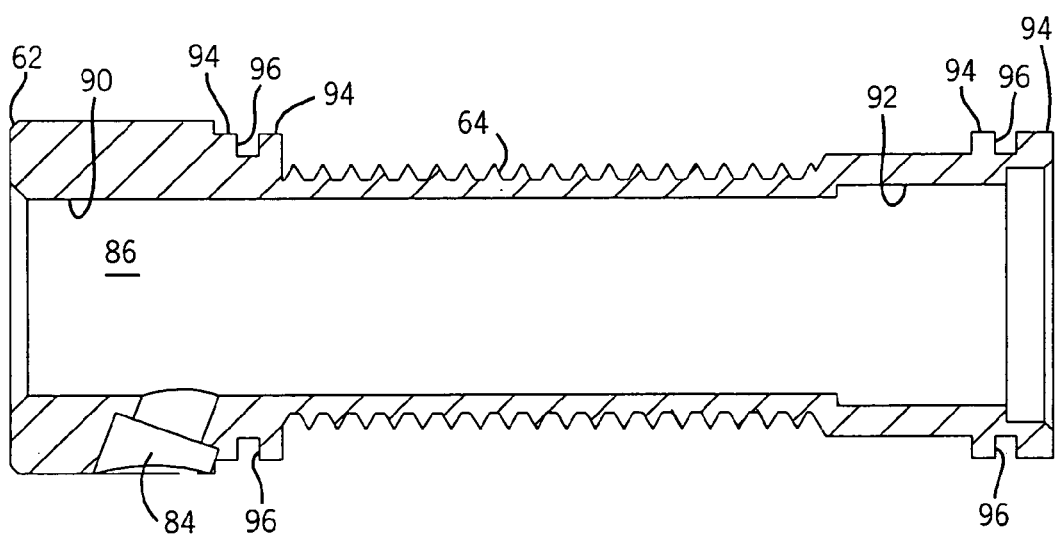
FIG. 6 is a cross-sectional view of a torch head body, in accordance with an exemplary embodiment of the present invention.

As illustrated in FIG. 6, the torch head body 62 has a single helical fin 64 that extends around a length of the torch head body 62. The proportion of the length of the helical cooling fin 64 to the length of the torch head body 62 may vary. In addition, the torch head body 62 may be formed with a plurality of helical cooling fins that extend along a length of the torch head body 62, or only partially along the length of the torch head body 62.

As discussed above, the torch head body 62 has a hollow interior 86 that is adapted to receive an electrode. A collet and collet body, or some other device, may be used to secure the electrode 44 to the torch head body 62. The gas inlet opening 84 enables gas to enter the hollow interior 86 of the torch head 62 to flow around the electrode 44. A back cap may be secured to a threaded portion 90 of the torch head body 62 to seal the hollow interior 86. A welding electrode securing member, such as a collet body or gas lens, may be secured to a second threaded portion 92 of the torch head body 62.

In addition, the torch head body 62 is adapted to couple electricity from the sleeve 66 to the electrode 44. In the illustrated embodiment, the torch head body 62 has a plurality of cylindrical surfaces 94 for receiving the sleeve 66. In addition, a pair of notches 96 is provided in the torch head body 62 to receive the silver rings 88. Once disposed over the torch head body 62, the sleeve 66 may be secured to the torch head body 62 by brazing, soldering, or some other method. Preferably, the torch head body 62 is comprised of a copper-lead-nickel alloy. However, other conductive materials may be used to form the torch head body 62.

Figure 7:
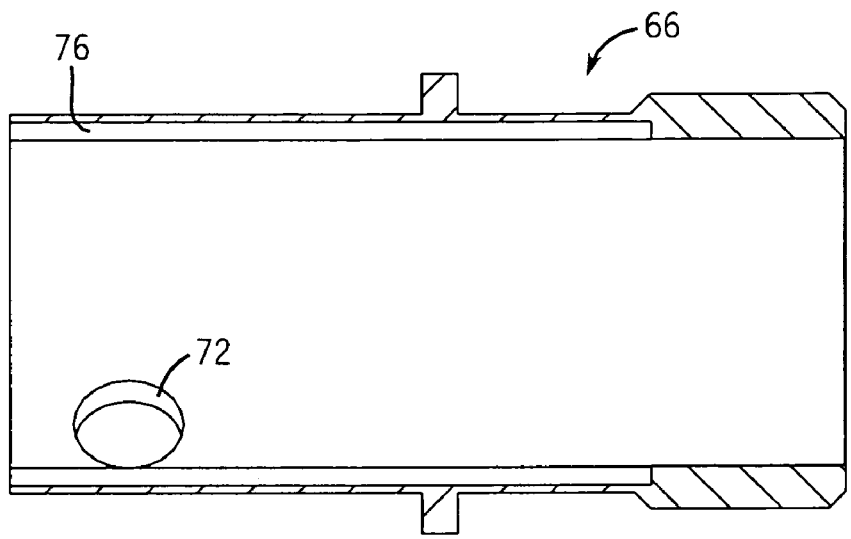
FIG. 7 is a cross-sectional view of a sleeve, in accordance with an exemplary embodiment of the present invention.

As illustrated in FIG. 7, the sleeve 66 is generally cylindrical to define a flow volume around the torch head body 62. Referring again to FIG. 3, the sleeve 66 has two holes: the liquid inlet 70 and the liquid outlet 72. In the illustrated embodiment, the sleeve 66 is formed with two grooves 76 located 180 degrees apart to engage the flanges 74 of the baffle 68 illustrated in FIG. 5. However, the sleeve 66 may be configured in a different orientation if the flanges 44 of the baffle 68 are oriented in a different orientation.

As discussed above, the sleeve 66 is adapted to couple electricity from the liquid supply tube 54 to the torch head body 62. Preferably, the sleeve 66 is comprised of copper, an excellent conductor. However, other conductive materials may be used to form the sleeve 66.

Figure 8:
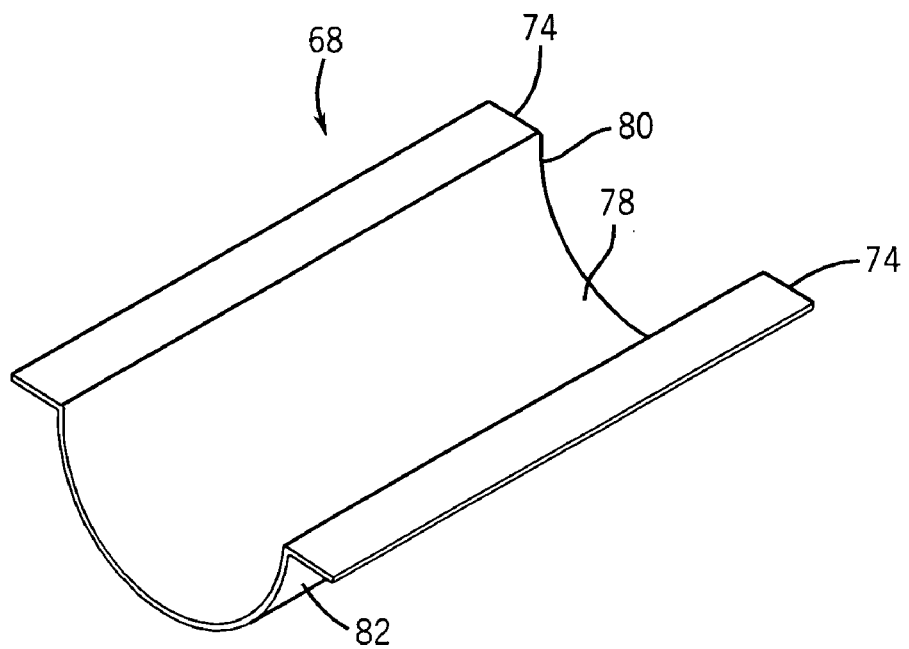
FIG. 8 is a perspective view of a baffle, in accordance with an exemplary embodiment of the present invention.

As illustrated in FIG. 8, the illustrated baffle 68 has a generally semi-cylindrical shape contoured to extend around the torch head body 62. However, the baffle 68 may be adapted with a different shape or contour. The baffle 68 is formed of a flexible material to enable the flanges 74 of the baffle 68 to be flexed into grooves 76 in sleeve 66. Preferably, the baffle 68 is comprised of stainless steel. However, other materials may be used to form the baffle 68.

The embodiments described above provided a welding torch system 10 with an enhanced liquid cooling system. Cooling liquid 24 is directed to flow over a helical cooling fin 64 extending along a length of a torch head body 62 to remove heat from the torch head body 62. The helical cooling fin 64 increases the effectiveness of convective heat transfer from the torch head body 62 to the cooling liquid 24. The helical cooling fin 64 increases the surface area of the torch head body 62 available for heat transfer. In addition, the helical cooling fin 64 induces the cooling liquid 24 to flow helically around the torch head body 62, increasing the length of travel of the cooling liquid 24 over the torch head body 62. The baffle 68 directs cooling liquid 24 to flow along the length of the torch head body 62 with the liquid inlet 70 and the liquid outlet 72 being located adjacent to each other at one end of the torch head 46.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A welding device, comprising:
   a torch head body operable to conduct electricity to a welding electrode disposed therein, the torch head body having a helical cooling fin extending along a length of the torch head body;
   a sleeve disposed around the torch head body, wherein the sleeve has a fluid inlet and a fluid outlet to enable a fluid to flow over the torch head body, the fluid outlet being disposed adjacent to the fluid inlet; and
   a baffle disposed within the sleeve between the fluid inlet and the fluid outlet to direct the fluid to flow along the length of the torch head body to enable the helical cooling fin to transfer heat to the fluid.

2. The welding device as recited in claim 1, comprising a fluid supply line coupled to the fluid inlet and a fluid return line coupled to the fluid outlet.

3. The welding device as recited in claim 2, wherein the helical cooling fin induces the fluid to flow helically around the torch head body from the fluid inlet to an end of the baffle.

4. The welding device as recited in claim 2, wherein the fluid flows helically around the torch head body from an end of the baffle to the fluid outlet.

5. The welding device as recited in claim 2, comprising a gas supply line coupled to a passageway in the torch head body.

6. The welding device as recited in claim 5, comprising a handle removably secured to the torch head body over the first fluid supply line, the cooling fluid return line, and the gas line.

7. The welding device as recited in claim 1, wherein fluid flows from the fluid inlet to the end of the baffle in an annular fluid channel defined by an inner surface of the baffle and an inner surface of the sleeve.

8. The welding device as recited in claim 1, wherein the torch head body comprises:
   an axial channel extending through the torch head body to enable the torch head body to receive a welding electrode; and
   a gas inlet extending through a side of the torch head body into the hollow interior to enable gas to enter the axial channel and flow through the axial channel around the welding electrode.

9. The welding device as recited in claim 8, wherein the gas inlet is disposed adjacent to the fluid inlet and the fluid outlet.

10. The welding device as recited in claim 9, wherein gas flows through the axial channel in the same axial direction as the cooling fluid flows from the fluid inlet to the end of the baffle.

11. A welding torch, comprising:
    an electrically-conductive torch head body comprising:
       at least one cooling fin extending helically around the torch head body; and
       a channel extending through the torch head body to enable the torch head body to receive gas and a welding electrode therein; and
    an electrically-conductive sleeve disposed concentrically around the torch head body to enable a fluid to flow over the at least one cooling fin, wherein the sleeve is electrically coupled to the torch head body to enable electricity to flow from the sleeve to the welding electrode via the torch head body.

12. The welding torch as recited in claim 11, wherein the sleeve comprises a fluid inlet and a fluid outlet disposed proximate to the fluid inlet.

13. The welding torch as recited in claim 12, comprising a baffle disposed within the sleeve between the fluid inlet and the fluid outlet to direct fluid to flow over the at least one cooling fin.

14. The welding torch as recited in claim 11, comprising a first tube coupled to the fluid inlet, a second tube coupled to the fluid outlet, and a gas tube coupled to a passageway into the interior of the torch head body.

15. The welding torch as recited in claim 14, comprising a handle disposed over the first tube, the second tube, and the gas tube.

16. The welding torch as recited in claim 14, wherein fluid flows over the at least one cooling fin in the same direction as gas flows thorough the interior of the torch head body.

17. A method of manufacturing a welding torch, comprising:
    disposing a cylindrical sleeve and a baffle over a torch head body having a helical cooling fin extending around the surface of the torch head body.

18. The method as recited in claim 17, comprising disposing the baffle within the interior of the cylindrical sleeve between a first opening through the sleeve and a second opening through the sleeve.

19. The method as recited in claim 18, wherein disposing the baffle comprises compressing the baffle to insert a pair of baffle flanges within a pair of grooves in the sleeve.

20. The method as recited in claim 17, comprising disposing a conductive member between the sleeve and the torch head body.

21. The method as recited in claim 20, comprising brazing the sleeve to the torch head body.

22. A method of cooling a welding torch, comprising:
    directing a cooling fluid to flow from a first end of the torch head to a second end of the torch head over at least one helical cooling fin of a torch head body; and
    directing the cooling fluid to flow from the second end of the torch head back to the first end of the torch head.

23. The method as recited in claim 22, wherein fluid enters the welding torch adjacent the first end of the torch head.

24. The method as recited in claim 22, wherein fluid enters the welding torch adjacent the second end of the torch head.

25. The method as recited in claim 22, wherein directing a cooling fluid comprises fluid enters the welding torch adjacent the second end of the torch head.

26. The method as recited in claim 22, wherein directing the cooling fluid to flow from the second end of the torch head to the first end of the torch head comprises directing the cooling fluid to flow through a coolant channel that bypasses the at least one helical cooling fin.

* * * * *